Patented May 12, 1942

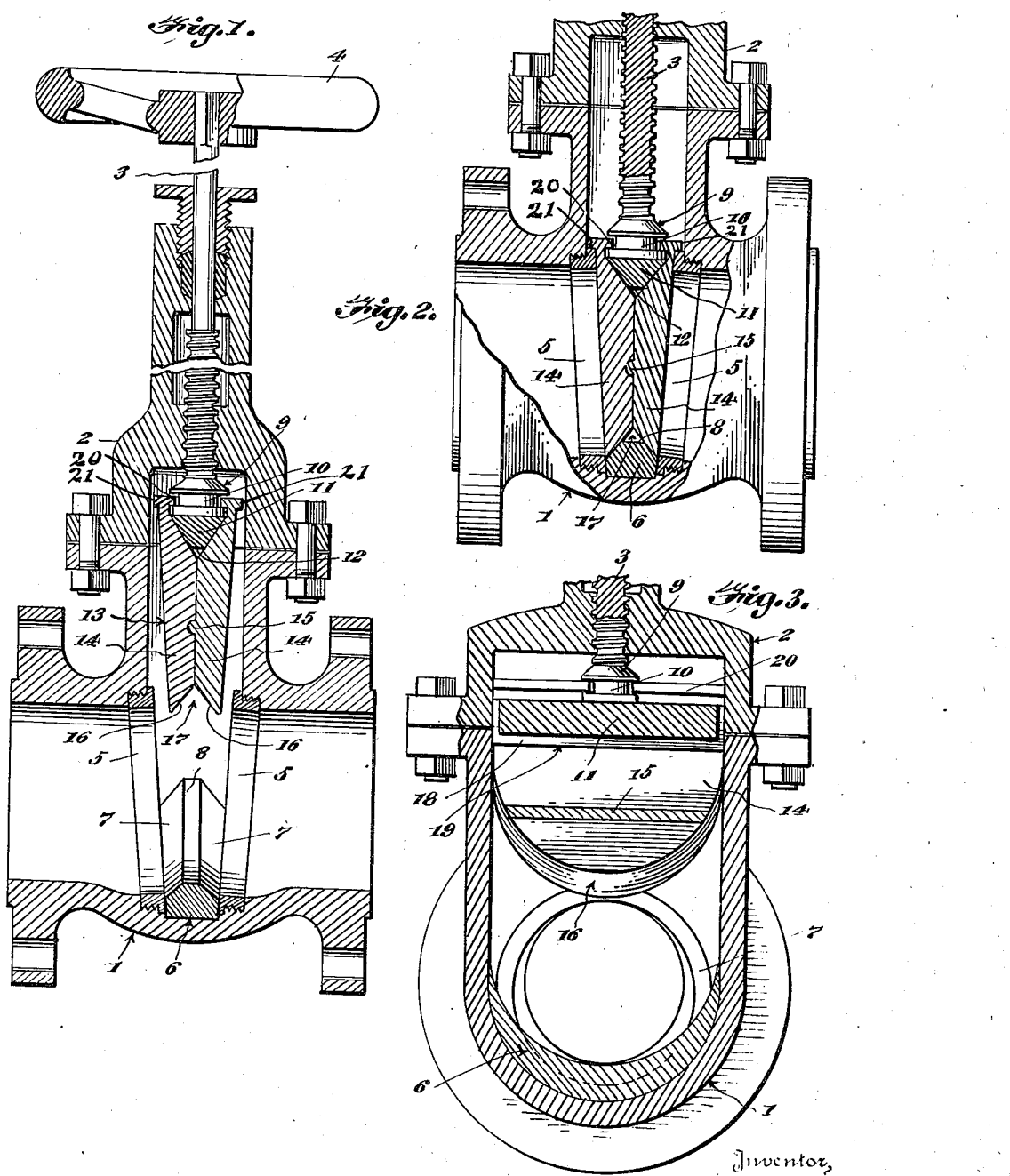

2,282,553

UNITED STATES PATENT OFFICE 2,282,553

GATE VALVE

Michael W. Banowetz, New Orleans, La., assignor to B & H Manufacturing Company, Inc., New Orleans, La., a corporation of Louisiana Application May 22, 1941, Serial No. 394,724

3 Claims. (Cl. 251—69)

This invention relates to a gate valve.

An object of the invention is the construction of a valve which eliminates a pocket that all valves prior to my invention have, and which pocket leaves a place for scale to settle in, causing the valve to seat unsatisfactorily, or in some cases, prevent the valve from seating.

Another object of the invention is the construction of a valve device that by reason of this novel element causes a self-flushing action, whereby the valve seat is always kept clean and in excellent condition.

A still further object of the invention is the construction of the discs of a valve in such a manner, together with their associated parts, as will prevent wear on the valve from effecting its efficiency.

With the foregoing and other objects in view, the invention comprises certain novel constructions, combinations, and arrangements of parts as will be hereinafter fully described illustrated in the accompanying drawings, and more particularly pointed out in the appended claims.

In the drawing:

Figure 1 is a vertical central sectional view of a gate valve constructed in accordance with the present invention, showing the same in an open position.

Figure 2 is a fragmentary view, partly in elevation and partly in vertical section of a gate valve constructed in accordance with the present invention, in a closed position.

Figure 3 is a fragmentary view, partly in elevation and partly in transverse section of a gate valve constructed in accordance with the present invention, the view being taken at right angles to Figure 1.

Referring to the drawing, in which I have shown the preferred embodiment of the present invention, I designates a valve casing. Detachably mounted upon the casing I is a cap or bonnet 2. Rotatably mounted through bonnet 2 is the valve stem 3, which stem 3 is provided at its upper and outer end with a wheel grip 4.

In casing I are two ring seats 5, 5, between which I have placed my crescent-shaped valve seat 6. This seat has opposite sides bevelled at 7, 7, (Fig. 1) and is provided with a flat top 8. Upon reference to Figure 1, it will readily be seen that there is no pocket or scale-gathering place in the bottom of the valve casing I, by reason of my invention.

Integral with the inner or lower end of stem 3 is a head 9. This head 9 is provided with an annular groove 10. Head 9 carries bar 11; bar 11 is V-shaped in cross section. Bar 11 is provided with a flat inner edge 12, for the purpose hereinafter specified.

A gate or valve 13 is carried by head 9. This valve 13 is substantially crescent-shaped (Fig. 3) and is formed of two crescent-shaped valve discs 14. A horizontal bead 15 extends from the inner face of one of the discs 14 into the other disc. (Fig. 1). The discs 14 each have a crescent-shaped bevel 16; the two bevels 16 confronting each other and forming a crescent-shaped socket 17, into which extends the flat top 8 and bevelled sides 7 of the valve seat 6 (Fig. 2), when the valve is in its closed position within the casing I. The inner faces of the discs 14 are bevelled at 18, producing a bar pocket 19, into which bar 11 extends. Each disc 14 has an inwardly-extending flange 20 formed on its upper end, and also an outwardly-extending disc guide 21 in the same horizontal plane with said flange 20. The flanges fit into the annular groove 10, whereby the valve 13 is supported upon head 9. The two disc guides 21 prevent the discs 14 from moving off the head, whereby said discs are always retained in an excellent operable condition.

The flat top 8 on the valve seat 6 is to allow the valve 13 to set up in case of wear.

The advantage of the flat inner edge 12 of the bar 11 resides in the fact that this edge allows for any wear, whereby the valve 13 always acts efficiently.

In the old type of gate valve it has been found that often the valve operates better if it is installed up-side-down, but such a position is not necessary with my improved gate valve, because long tests and experience therewith prove that the valve will act efficiently over a long period when it is placed in its normal upright position.

By reason of the novel structure of the valve seat 6 it is always kept clean, as the self-flushing action prevents any foreign substance collecting, which also eliminates any scale accumulating on the bottom of the casing I contiguous to the valve seat 6. Consequently, my valve is always clean and efficient and in actual practice the crescent-shaped valve seat and the crescent-shaped valve are not only simple in construction, but efficient in operation.

While I have described the preferred embodiment of my invention and illustrated the same in the accompanying drawing, certain changes or alterations may appear to one skilled in the art to which this invention relates during the extensive manufacture of the same, and I, therefore, reserve the right to make such changes or alterations as shall fairly fall within the scope of the appended claims.

What I claim is:

1. In a gate valve, a casing open at its ends and formed with a longitudinal bore and having an upstanding neck intermediate its length and an internal pocket in its bore under said neck, rings in the pocket threaded to walls of the casing at opposite ends of the pocket and converging downwardly, a crescent-shaped valve seat in said pocket fitting snugly into and filling the space between lower portions of said rings and having a portion projecting upwardly from inner side-edges of lower portions of the rings and bevelled from its opposite sides and formed with a flat upper edge face, a bonnet mounted upon said neck, a stem threaded through said bonnet, a head at the lower end of said stem formed with a circumferential groove, a gate consisting of semi-circular discs having confronting inner side-faces contacting with each other and formed along their upper ends with registering recesses and flanges along upper edges of the recesses engaged in the groove of said head, a cross bar carried in said recesses and being V-shaped in cross section, one disc having a transversely-extending groove in its inner side face and the other disc being formed with a transverse rib engaged in the groove, and said discs having their arcuate marginal edge-faces bevelled inwardly to form the gate with a marginal groove V-shaped in cross section, the protruding portion of the valve seat being engaged in the marginal groove of the gate and forcing outer side-faces of the discs into tight contacting engagement with inner side faces of the rings when the gate is lowered to a closed position by turning said stem.

2. In a gate valve, the combination with a casing being provided with an internal pocket, of rings in said pocket threaded to walls of the casing at opposite ends of the pocket and converging downwardly, a crescent-shaped valve seat in said pocket fitting snugly into and filling the space between the lower portions of said downwardly-converging rings and having a portion projecting upwardly from inner side-edges of the lower portions of said rings and bevelled on opposite sides, a gate comprising semi-circular discs having confronting inner side-faces contacting completely with each other, said discs having their entire arcuate marginal edge-faces bevelled inwardly to form the gate with a marginal groove V-shaped in cross section, and the protruding portion of the valve seat being engaged in the marginal groove of the gate and forcing outer side-faces of the disc into tight contacting engagement with the inner side-faces of said downwardly converging rings when the gate is lowered to a closed position.

3. In a gate valve, the combination of a casing being provided with an internal pocket, of rings in said pocket threaded to walls of the casing at opposite ends of the pocket, a valve seat in said pocket fitting snugly into and filling the space between the lower portions of said rings and having a portion projecting upwardly from inner side-edges of the lower portions of said rings and bevelled on opposite sides, a gate comprising discs having confronting inner side-faces contacting completely with each other, said discs having their entire arcuate marginal edge-faces beveled inwardly to form the gate with a marginal groove V-shaped in cross section, and the protruding portion of the valve seat being engaged in the marginal groove of the gate and forcing outer side-faces of the discs into tight contacting engagement with the inner side-faces of said rings when the gate is lowered to a closed position.

MICHAEL W. BANOWETZ.